US007262732B2

(12) United States Patent
Wang et al.

(10) Patent No.: US 7,262,732 B2
(45) Date of Patent: Aug. 28, 2007

(54) METHOD AND APPARATUS FOR FAST SATELLITE ACQUISITION VIA SIGNAL IDENTIFICATION

(75) Inventors: James June-Ming Wang, San Marino, CA (US); Min-Yaug Yang, Irvine, CA (US); Robert A. Warner, Holmdel, NJ (US)

(73) Assignee: Motia Inc., Pasadena, CA (US)

( * ) Notice: Subject to any disclaimer, the term of this patent is extended or adjusted under 35 U.S.C. 154(b) by 365 days.

(21) Appl. No.: 10/993,732

(22) Filed: Nov. 19, 2004

(65) Prior Publication Data

US 2006/0119509 A1 Jun. 8, 2006

(51) Int. Cl.
*H01Q 3/00* (2006.01)
*H04N 7/20* (2006.01)

(52) U.S. Cl. ........................................ 342/359; 725/72

(58) Field of Classification Search ................ 342/359; 725/72

See application file for complete search history.

(56) References Cited

U.S. PATENT DOCUMENTS

| | | | | |
|---|---|---|---|---|
| 5,488,379 | A * | 1/1996 | Jackson et al. | 342/359 |
| 5,585,804 | A | 12/1996 | Rodeffer | 342/359 |
| 5,828,947 | A | 10/1998 | Michel et al. | 455/13.4 |
| 5,828,957 | A | 10/1998 | Kroeger et al. | 455/428 |
| 6,127,967 | A | 10/2000 | Ghazvinian et al. | 342/354 |
| 6,195,328 | B1 | 2/2001 | Tsui et al. | 370/210 |
| 6,504,504 | B1 * | 1/2003 | Tits et al. | 342/359 |
| 6,667,715 | B1 | 12/2003 | Chang et al. | 342/373 |
| 6,683,566 | B2 | 1/2004 | Jeon et al. | 342/383 |
| 6,693,587 | B1 * | 2/2004 | Kuether et al. | 342/359 |

* cited by examiner

*Primary Examiner*—Gregory C. Issing
(74) *Attorney, Agent, or Firm*—Patentry; Peter G. H. Hwang

(57) ABSTRACT

The invention relates to a method and apparatus for fast satellite antenna acquisition via signal identification. The method and apparatus operate by positioning a satellite antenna using signal identification in order to reduce false satellite signal locks and missed detections and speed the acquisition of the correct satellite.

25 Claims, 6 Drawing Sheets

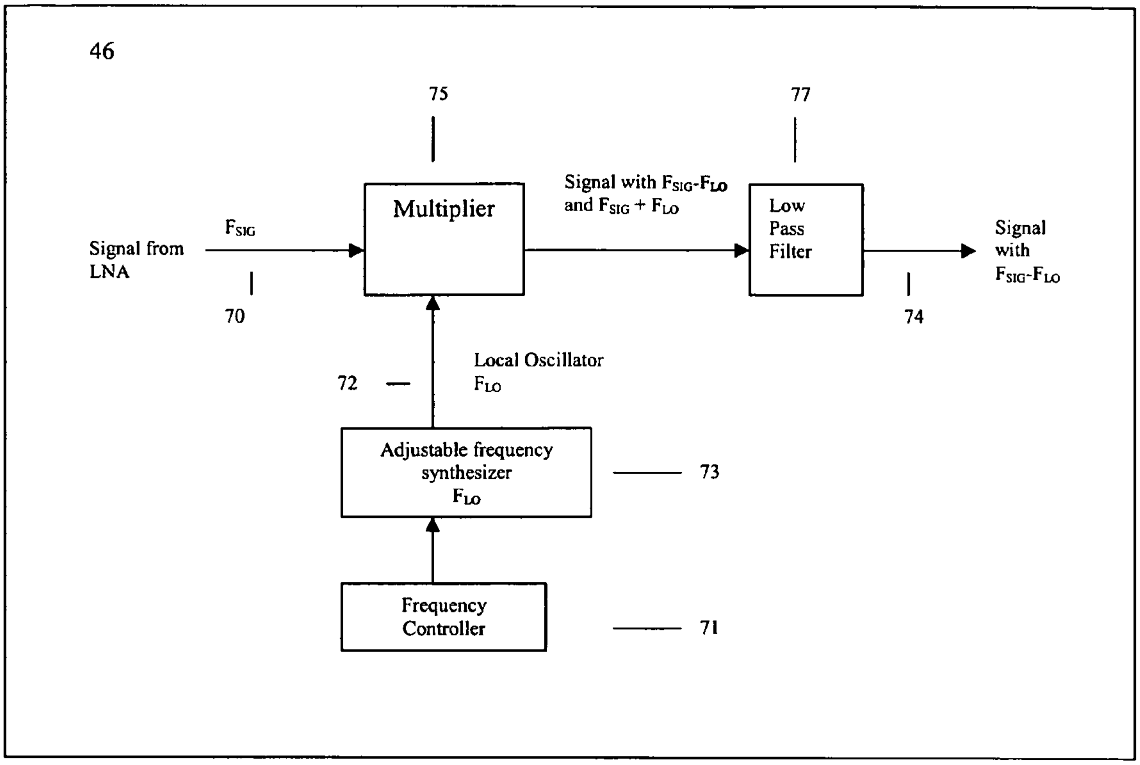
Fig. 5 Block diagram for downconverter

METHOD AND APPARATUS FOR FAST SATELLITE ACQUISITION VIA SIGNAL IDENTIFICATION

BACKGROUND OF THE INVENTION

1. Field of the Invention

This invention relates generally to location finding and tracking of a satellite by an antenna system. Specifically, this invention relates to satellite antenna acquisition via accurate signal identification for reducing the time for acquisition of a correct satellite.

2. Description of Related Art

Fixed satellite and vehicle-mounted in-motion satellite tracking antennas provide users a means to achieve one-way or two-way communication via satellites. In both fixed and in-motion use, satellite antennas need to be positioned correctly in space in order to receive a signal from a desired satellite. In a fixed satellite application, the set up procedure is performed upon installation and generally does not require satellite re-acquisition unless more than one satellite is desired or natural or environmental effects, such as storms or wildlife, disturb the satellite antenna position. In the in-motion use, the satellite antennas need to be positioned correctly each time they are activated, while they are in-motion and each time they lose the satellite signal due to blockage by objects that naturally appear between the satellite antenna and the satellite as the vehicle moves.

The time it takes to reacquire the satellite signal can range from an annoyance to a technology acceptance-limiting event. In a fixed application, although the occurrence of an incorrectly positioned satellite antenna is infrequent, a trained technician is generally required to position the satellite antenna correctly. Satellite service in this case could be down for hours or days. In in-motion use, satellite reacquisition occurs very frequently with significant, but shorter time intervals to correct positioning.

In conventional satellite antenna acquisition steps, whether manual or automatic, the sky is searched by scanning 360 degrees in azimuth and 20 to 70 degrees in elevation angle. Signal detection during scanning is a two-step process:

1. First, the total received in-band signal power is monitored. As soon as the in-band signal power exceeds a certain threshold level, the antenna is held pointed toward that position in space waiting for a set top box to lock on to the signal and confirm the signal lock.

2. Second, the set top box locks and confirms the signal lock.

The antenna scanning speed and the antenna acquisition time are closely related to how fast the power monitoring in Step 1 can be performed and how fast the confirmation from the set top box in Step 2 can be accomplished. Typically, power monitoring can be performed within a few milliseconds. This means that the speed at which the antenna can scan its beam width through the target can never be faster than a few milliseconds.

Beyond the time and effort required to correctly position the satellite antenna and achieving set top box signal lock (typically about 2-3 seconds), the signal acquisition process is problematic because there are many ways a satellite antenna can experience a false lock. Typical examples of false lock include: locking on a wrong satellite with the same frequency; signal power fluctuation due to noise, inaccuracy in power monitoring and detection circuitry; locking onto the sidelobe of other terrestrial radiators at a closer distance; locking on to noise and locking onto a reflected signal from a nearby structure. Each false lock increases the antenna acquisition time by a few seconds.

The design of the antenna acquisition steps is significantly impacted by the false lock and missed detection effects. If the power-monitoring threshold in Step 1 is set high, false lock probability is reduced. However, there is a higher possibility of missed detection. Each time the missed detection occurs, the antenna must scan through the entire cycle then change the threshold again, then scan again, keep on repeating the process, before returning to the correct position for antenna acquisition. This increases the acquisition time significantly. Lowering the power monitoring threshold in Step 1 leads to frequent false lock, each costing a 2 to 3 second penalty (for Step 2) in antenna acquisition time. Thus, false locks can significantly increase the overall antenna acquisition time.

U.S. Pat. No. 5,585,804 describes the use of electronic compasses to decrease the scanning range, thereby speeding up the satellite signal acquisition. However, electronic compasses can be negatively affected by metal structures or magnetic field from conductors carry current of electrical components in the vehicle. And it is almost impossible to have the resolution of less than 10 degree for automobile application. Which make them unreliable in use with most vehicles and tend to be overly costly for large volume cost sensitive applications.

U.S. Pat. No. 5,828,957 describes an antenna acquisition means by searching for and acquiring a strongest pilot channel, searching for signaling channels on the acquired strongest pilot channel and monitoring the acquired signaling channel instead of beam acquisition of a modulated channel. This system has the limitation that the satellite must transmit pilot tone.

U.S. Pat. No. 6,127,967 describes an antenna acquisition means by searching for and acquiring a beacon signal. This system has the limitation that the desired satellite must transmit a beacon signal.

It is desirable to provide an improved approach to significantly reduce false lock error and the time it takes to acquire the desired satellite at a reasonable cost.

SUMMARY OF THE INVENTION

It has been found that in satellite signal acquisition, many factors affect the system performance including:

1. the position in azimuth of the satellite to the original pointing position of the satellite antenna since, the further the original pointing position is away from the satellite antenna, the longer it will take to acquire the satellite under event the best of situations;

2. the position in elevation of the satellite to the original pointing position of the satellite antenna since, the further the original pointing position is away from the satellite antenna, the longer it will take to acquire the satellite under even the best of situations;

3. the number of satellites with nearby frequencies, the more nearby satellite signal frequency congestion, the higher the probability that a false lock will occur;

4. the number of terrestrial or low altitude radiators at a close distance since, the more high-powered sources of signal frequency, the higher the probability that a false lock will occur;

5. the signal reflection since, the more facsimiles of the same signal frequency from the desired satellite, the higher the probability that a false lock will occur; and 6. the noise and interference since too many powerful and errant unwanted signal frequencies increase the probability that a missed detection or false lock will occur.

Each individual factor increases satellite antenna acquisition time and the possibility of false locks.

The present invention positions a satellite antenna using signal identification to accurately determine antenna signal lock and speed the acquisition of the correct satellite. The present invention improves system performance by looking at characteristics of the satellite signal in order to reduce false lock error. The present invention can operate at a comparable or faster speed of conventional power detection schemes.

The advantages of the invention include improved in-motion satellite reception and a faster fixed satellite antenna installation and installation tuning process. The invention will be more fully described by the reference to the following drawings.

BRIEF DESCRIPTION OF THE DRAWINGS

FIG. 5 is a schematic diagram of a downconverter.

DETAILED DESCRIPTION

Figure 1:
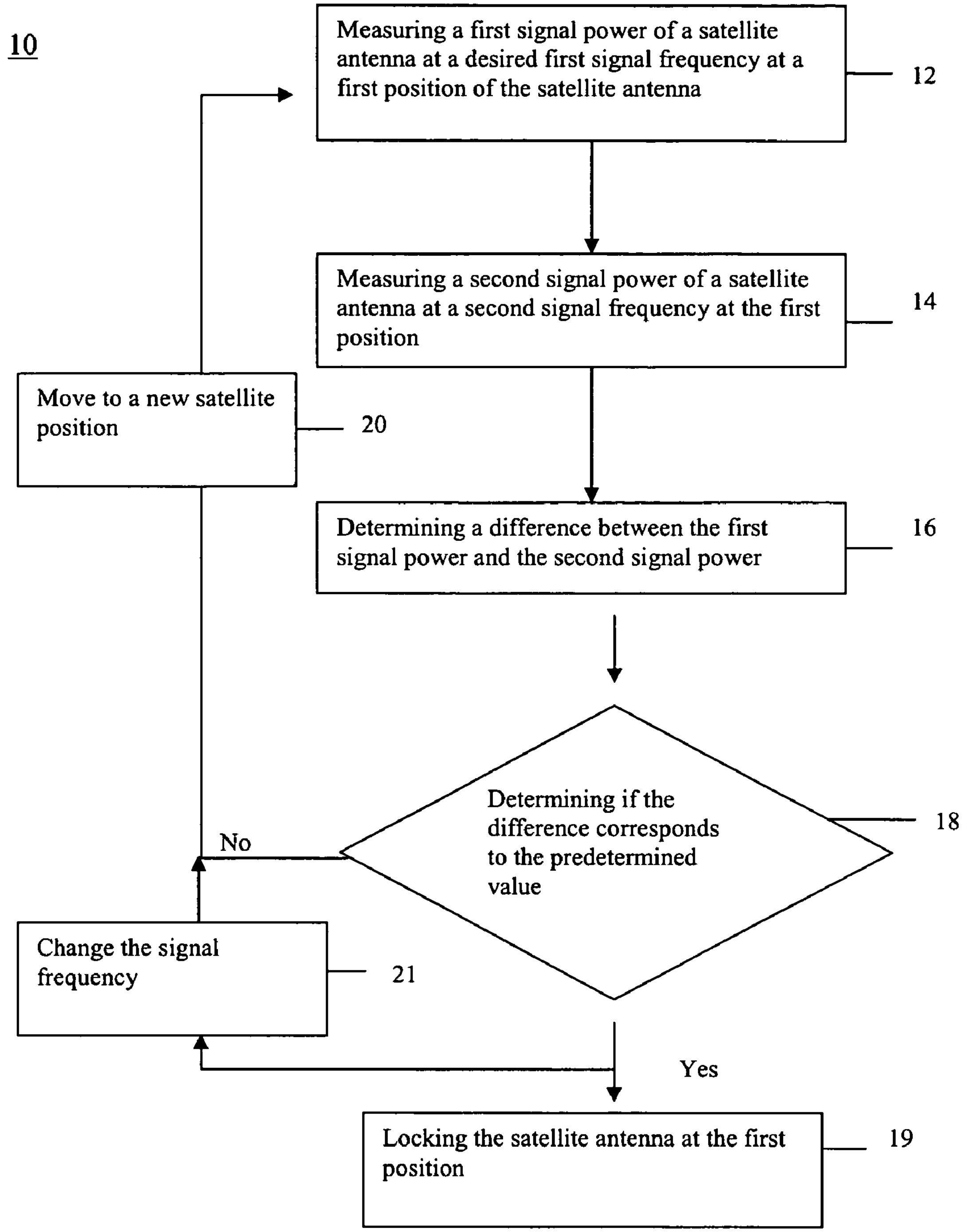
FIG. 1 is a flow diagram of a method for satellite acquisition via signal identification.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a flow diagram of a method for satellite acquisition via signal identification 10 in accordance with the teachings of the present invention. In block 12, a first signal power of a satellite antenna at a desired first signal frequency is measured at a first position of the satellite antenna. For example, the desired first signal frequency can correspond to a peak of a transponder signal. In one embodiment, the signal is a direct broadcast signal.

Figure 2:
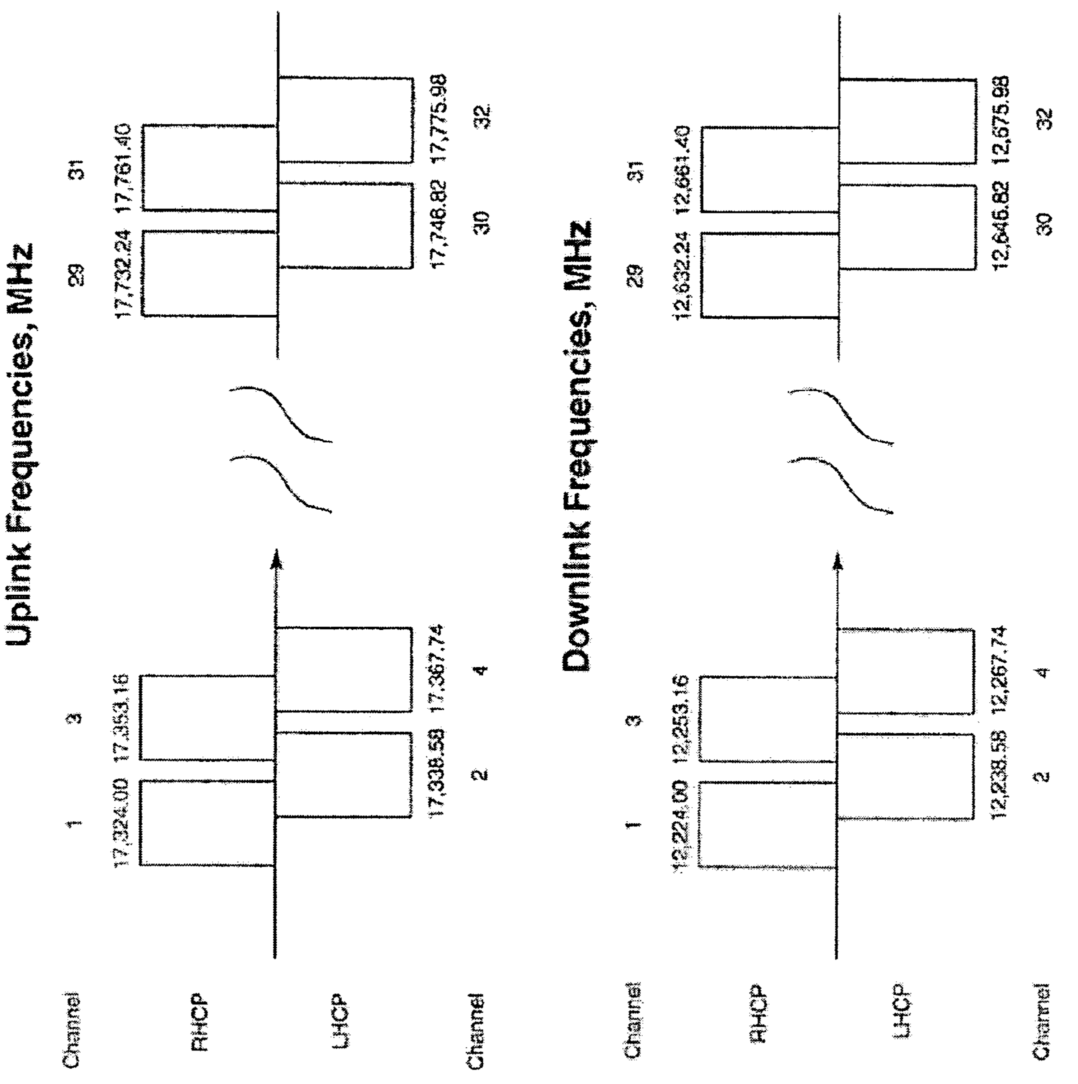
FIG. 2 is a schematic diagram of a total DBS downlink signal spectrum.

FIG. 2 illustrates the characteristics of the direct broadcast satellite (DBS) signal. It carries 32 transponder signals with two circular polarizations. The DBS signal has a total bandwidth of 500 MHz, including thirty-two 24 MHz transponder signals with a 5 MHz spacing between the transponder signals. Sixteen of the transponder signals use right-hand circular polarization and the other sixteen transponder signals use left-hand circular polarization. The transponder signal on the right-handed circular polarization are at 12.224 GHz, 12.253 GHz, and up through 12.661 GHz, and the transponder signal on the left-handed circular polarization are at 12.238 GHz, 12.267 GHz, and up through 12.675 GHz. Accordingly, in this embodiment, power is monitored at a predetermined frequency of a peak of one or more of the DBS transponder signals in block 12. In alternate embodiments, the satellite signals can be fixed satellite service (FSS) and very small aperture satellite (VAST) signals and predetermined frequencies of the satellite signals can be measured.

Referring to FIG. 1, a second signal power of a satellite antenna at a desired second signal frequency is measured at the first position of the satellite antenna, in block 14. In one embodiment, the second signal frequency can be at a spacing between the transponder signal measured in block 12 and an adjacent transponder signal. It is appreciated that the power at the spacing between two adjacent transponder signals should have a lowest value. This typically corresponds to noise level between the adjacent transponders or spectral sidelobe of the two adjacent transponders.

In block 16, a difference of the first signal power and the second signal power is determined. In block 18, it is determined if the difference corresponds to a predetermined value. If the difference corresponds to a predetermined value, the satellite antenna is determined to be correctly positioned to receive a signal from the desired satellite and the satellite antenna can be locked at the first position, in block 19. It has been found that the difference can differ by more than 10 dB. If the difference does not correspond to the predetermined value, the antenna is beam steered or moved to a different satellite position rather than the first position of satellite, in block 20, and blocks 12-18 can be repeated. If the difference exceeds the predetermined value, blocks 12-18 can be repeated with a peak frequency of one or more of the transponder signals of the DBS signal for confirmation that satellite is locked. Each of the blocks of method 10 and method 20 can be performed in sequence or in parallel and all the blocks do not have to be performed. Alternatively, the first signal frequency and the second signal frequency can be outside of DBS signal bandwidth as an additional check to confirm signal lock. In this embodiment, the measurements at the two frequencies separated by the same amount do not have a peak and valley of signal power as the first signal frequency and the second signal frequency within the DBS signal bandwidth. The present invention can also be used during antenna tracking to monitor if the antenna stays locked on to the satellite. The satellite antenna can be steered in the azimuth and elevation positions and method 10 and method 20 can be performed at their various positions.

Figure 3:
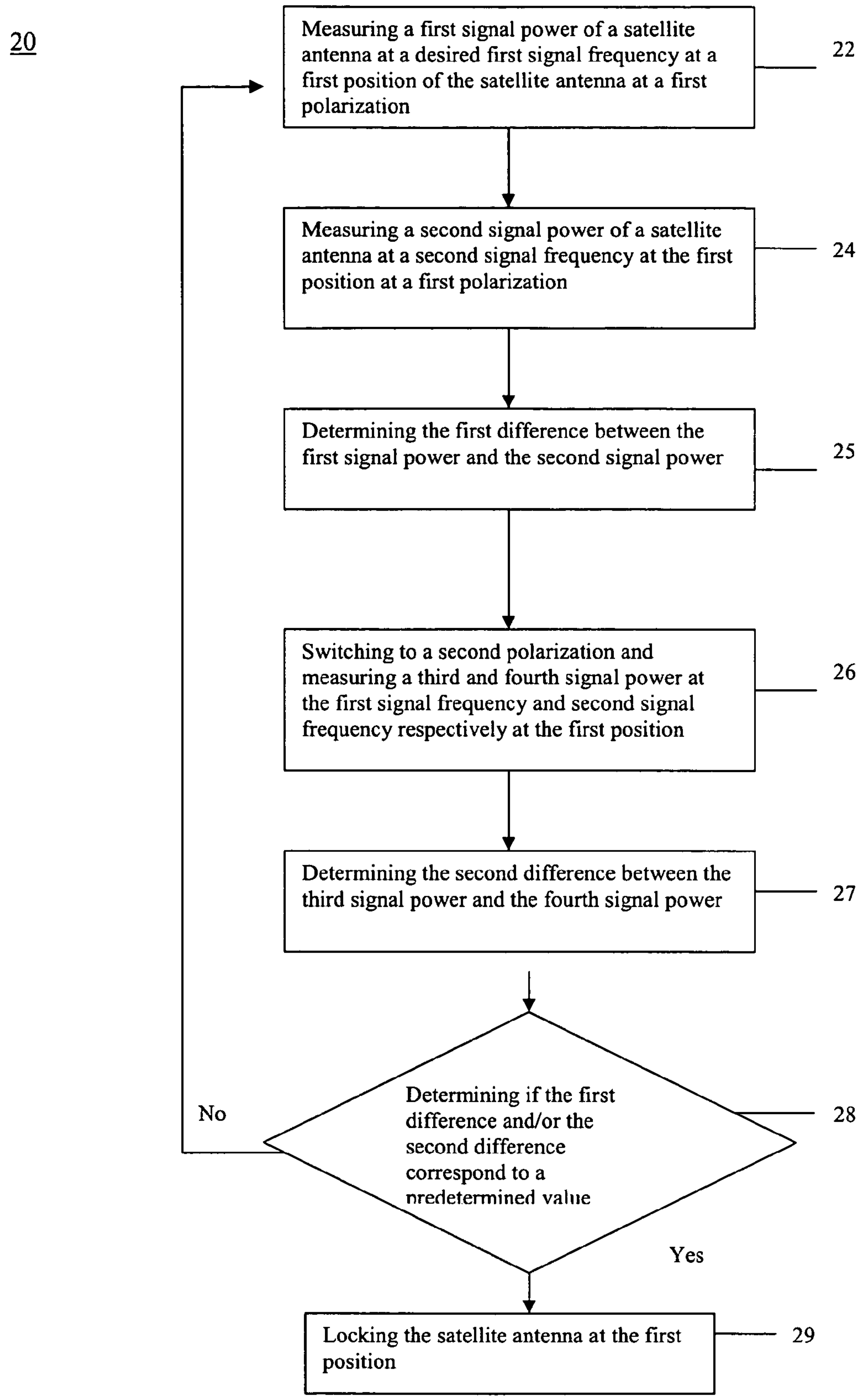
FIG. 3 is a flow diagram of an alternate embodiment of a method for satellite acquisition via signal identification.

FIG. 3 is a flow diagram of an alternate embodiment of a method for fast satellite acquisition via signal identification 20. In block 22, a first signal power of a satellite antenna at a desired first signal frequency is measured at a first position of the satellite antenna at a first polarization. In block 24, a second signal power of a satellite antenna at a desired second signal frequency is measured at the first position of the satellite antenna at the first polarization. In block 25, a first difference of the first signal power and the second signal power is determined. In block 26, a switch to a second polarization is performed and a third signal power is measured at the first signal frequency at the second polarization and a fourth signal power is measured at the second signal frequency at the second polarization. Both the first signal frequency and the second signal frequency can be measured at the first position. In block 28, a second difference of the third signal power and the fourth signal power is determined. The second polarization is opposite to the first polarization. It has been found that a peak in signal power at a certain frequency at one polarization corresponds to the valley in signal power at the same frequency but with the opposite polarization. In block 29, it is determined if the first difference and/or the second difference corresponds to a predetermined value. If the first difference and/or the second difference corresponds to a predetermined value, the satellite antenna is determined to be correctly positioned to receive, a signal from the desired satellite and the satellite antenna can be locked at the first position. If the difference does not correspond to the predetermined value, blocks 22-28 can be repeated by using a different first signal frequency in blocks 22 and 26 and different second signal frequency in blocks 24 and 26. For example, blocks 22-28 can be repeated with a frequency of a peak of one or more of the transponder signals of the DBS signal. Alternatively, blocks 22-28 can be repeated with the first signal frequency in blocks 22 and 26 and the second signal frequency in blocks 24 and 26 measured at a different position of the satellite antenna.

Figure 4A:
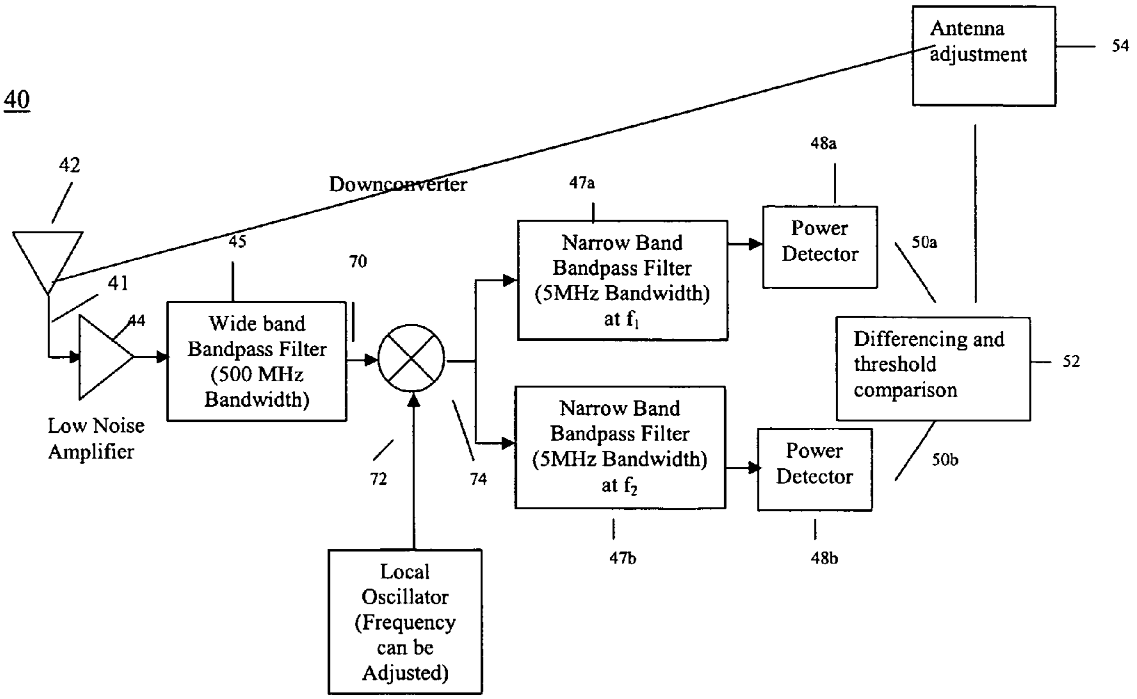
FIG. 4A is a schematic diagram of a satellite acquisition system including a satellite antenna receiver power monitoring circuit.

FIG. 4A is a schematic diagram of a satellite acquisition system 40 including a satellite antenna receiver power monitoring circuit. Signal 41 from satellite antenna 42 is amplified with low noise amplifier 44. Signal 41 is filtered with bandpass filter 45. Bandpass filter can be a wide bandpass filter having a bandwidth of the entire signal. For example, for a DBS signal bandpass filter 45 can have a 500 MHz bandwidth. The signal goes through a down-converter to a lower intermediate frequency (IF) frequency. In one embodiment, the, signal goes through two stages of down-conversion, initially through the first IF frequency and subsequently through the second IF frequency. Two stages of down-conversions are used to provide good image frequency rejection and also be able to implement a narrower bandpass filter at a low frequency (second IF). In the case of DBS, the first IF is typically at 950 MHz to 1.45 GHz (spanning 500 MHz) and the second IF can be in the sub-100 Mhz range. The selection of the second IF frequency allows the 5 MHz bandpass filter to be reliably implemented with roughly 5% to 10% bandwidth (i.e., 5 MHz divided by the $2^{nd}$ IF). Local oscillator of down-converter 46 is adjusted to select a desired signal frequency to measure the signal power. For example, if the desired signal frequency of the received signal to be sampled is at $F_{SIG}$ and a center frequency of the 5 MHz bandpass filter is at $f_1$, the local frequency $F_{LO1}$ can be set adjusted to $F_{SIG}-F_1$. Accordingly, this allows the signal spectrum at $F_{SIG}$ to pass through the center of the filter bandpass while the signal away from the $F_{SIG}$ is rejected by the filter.

One or more narrow band bandpass filters 47*a* can be used to monitor power at specific frequencies. For example, narrow band bandpass filters 47*a* can have a bandwidth of approximately 5 MHz for a DBS signal, which corresponds to the peak of each transponder signal, at one polarization. The polarizations of narrow band bandpass filters 47*a*, 47*b* can be switched. The bandwidth of narrow band bandpass filters 47*a*, 47*b* can be adjusted for evaluating various satellite signals, such as FSS and VAST signals.

One or more narrow band bandpass filters 47*b* can be used to measure power at an adjacent 5 MHz spacing between two transponders at the same polarization. At the 5 MHz spacing the signal power should be the lowest. Power detector 48*a* detects the power 50*a* of signal 49*a* from narrow band bandpass filter 47*a*. Power detector 48*b* detects the power 50*b* of signal 49*b* from narrow band bandpass filter 47*b*. Additional power detectors 48 can be used if additional narrow band bandpass filters 47 are used. Processing means 52 determines a difference of between power 50*a* and power 50*b*. For example, processing means 52 can be a microprocessor. Processing means 52 activates satellite antenna adjustment means 54 for locking satellite antenna 52 or scanning satellite antenna in the azimuth and elevation positions with conventional methods.

Figure 4B:
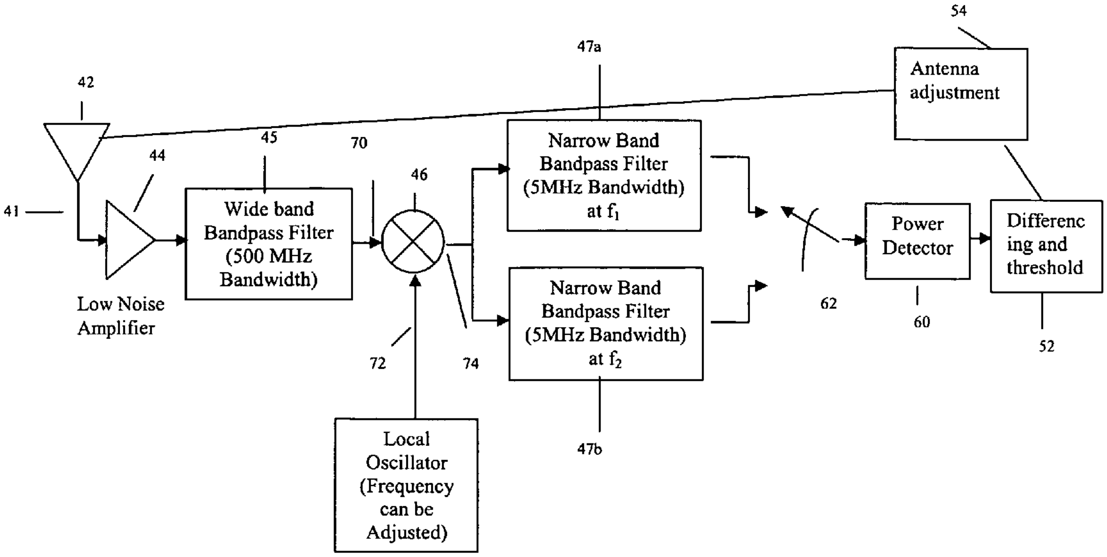
FIG. 4B is a schematic diagram of an alternate embodiment of a satellite acquisition system including a satellite antenna receiver power monitoring circuit.

FIG. 4*b* illustrates an alternate embodiment in which signal power from narrow band bandpass filter 47*a* and narrow band bandpass filter 47*b* is sampled using a signal power detector 60 by alternating switch 62. Power detector 60 determines power of signal 49*a* and power of signal 49*b*. Processing means 52 determines a difference of between power 50*a* and power 50*b*.

FIG. 5 is the block diagram for down-converter 46. The $F_{SIG}$ 70 is the signal from LNA, which will multiply in the multiplier 75 with the output of local oscillator 72 $F_{LO}$. The frequency of the $F_{LO}$ is generated by synthesizer 73 and controlled by frequency controller 71, which adjust the $F_{LO}$ so that the output of down converter will have two frequency components ($F_{SIG}+F_{LO}$) and ($F_{SIG}-F_{LO}$). After low pass filter 77, the high frequency components will be filtered and only the low frequency components left which should have the center frequency of $F_1$ and $F_2$ as defined in narrow band bandpass filters 47*a* and 47*b*. The setting for the local oscillator should be: $F_{LO}=F_{SIG}-F_1$ or $F_{LO}=F_{SIG}-F_2$.

In general, the method and system of the present invention has the following advantages: the monitoring of signal power can be accomplished expeditiously, typically within about a few milliseconds, thereby providing fast signal scanning and fast signal acquisition. For example, if the antenna azimuth beam width is about 2 degrees, the satellite antenna can scan through every two degrees within about 5 milliseconds, thereby providing scanning of 360 degrees within about 1 second. The only limited factor is the speed of the motor to turn the antenna for azimuth tracking. The present invention provides significant reduction in the false lock probability by using individual detectors of signal characteristics, thereby a typical antenna acquisition can be accomplished within a single scan through a possible region. The present invention provides in one embodiment, lessened sensitivity to the accuracy of the signal power monitor because the relative signal levels at two different frequencies rather than an absolute signal power level monitored. The differential power can also reduce the fluctuations of outputs from power detectors due to environmental influence such as temperature or drift of parameters.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for satellite acquisition comprising the steps of:

a) determining a first signal power at a first signal frequency of a satellite signal received at a satellite antenna from said satellite at a first position of said satellite antenna;

b) determining a second signal power at a second signal frequency of the satellite signal at the first position; and c) determining a difference between the first signal power and the second signal power; and d) if said difference is greater than or equal to a predetermined value, locking said satellite antenna to said satellite at said first position of said satellite antenna.

2. The method of claim 1 wherein said first signal frequency corresponds to a peak of a transponder signal.

3. The method of claim 2 wherein said second signal frequency is at a spacing between said transponder signal and adjacent transponder signal.

4. The method of claim 1 wherein said satellite signal is a direct broadcast satellite (DBS) signal.

5. The method of claim 1 wherein said satellite signal is a fixed satellite service (FSS) signal.

6. The method of claim 1 wherein said satellite signal is a very small aperture (VAST) signal.

7. The method of claim 1 wherein if said difference is less than said predetermined value further comprising the steps of repeating steps a through d at a different first signal frequency and a different second signal frequency.

8. The method of claim 1 wherein if said difference is less than said predetermined value further comprising the step of repeating steps a through d at a different position of said satellite antenna.

9. A method for satellite acquisition comprising the steps of:

a) determining a first signal power at a first signal frequency of a satellite signal received at a satellite antenna from said satellite at a first position of said satellite antenna at a first polarization;

b) determining a second signal power at a second signal frequency of the satellite signal at the first position at the first polarization; and c) determining a first difference between the first signal power and the second signal power;

d) switching to a second polarization;

e) determining a third signal power in said first signal frequency and said second polarization;

f) determining a fourth signal at said second signal frequency and said second polarization;

g) determining a second difference between the third signal power and the fourth signal power;

h) if said first difference and/or said second difference is greater than said predetermined value, locking said satellite antenna to said satellite at said first position of said satellite antenna.

10. The method of claim 9 wherein said first signal frequency corresponds to a peak of a transponder signal.

11. The method of claim 10 wherein said second signal frequency is at a spacing between said transponder signal and adjacent transponder signal.

12. The method of claim 9 wherein said satellite signal is a direct broadcast satellite (DBS) signal.

13. The method of claim 9 wherein said satellite signal is a fixed satellite service (FSS) signal.

14. The method of claim 9 wherein said satellite signal is a very small aperture (VAST) signal.

15. The method of claim 9 wherein if said difference is less than said predetermined value further comprising the steps of repeating steps a through h at a different first signal frequency and a different second signal frequency.

16. The method of claim 9 wherein if said difference is less than said predetermined value further comprising the steps of repeating steps a through h at a different position of said satellite antenna.

17. A satellite antenna system comprising:

an amplifier receiving a satellite signal transmitted from a satellite;

one or more local oscillators coupled to said amplifier;

one or more bandpass filters each coupled to respective ones of said local oscillators, and means for detecting power of each of one or more signals from said respective one or more bandpass filters;

means for determining from said power if said satellite is a desired satellite servicing a geographical area in which said satellite antenna receiver is located;

means for locking said antenna receiver to said satellite of said desired satellite is determined; and tracking means coupled to said satellite antenna for aiming said satellite antenna on a selected satellite while said satellite antenna is in motion.

18. A system for processing a satellite signal transmitted from a satellite comprising:

means for determining a first signal power at a first signal frequency of a satellite signal received at a satellite antenna from said satellite had a first position of said satellite antenna;

means for determining if said first signal power is greater than a predetermined value;

means for determining a second signal power of the satellite signal at a second signal frequency;

means for determining a difference between said first signal power and said second signal power; and means for locking said satellite antenna at said first position if said difference is greater than or equal to a predetermined value.

19. The system of claim 18 further comprising means for tracking said satellite signal on a selected satellite when said satellite antenna is in motion.

20. The system of claim 18 further comprising means for switching a polarization of said first signal frequency and said second signal frequency.

21. The system of claim 18 wherein said first signal frequency corresponds to a peak of a transponder signal.

22. The system of claim 18 wherein said second signal frequency is at a spacing between a transponder signal and an adjacent transponder signal.

23. The system of claim 18 wherein said satellite signal is a direct broadcast satellite (DBS) signal.

24. The system of claim 18 wherein said satellite signal is a fixed satellite service (FSS) signal.

25. The system of claim 18 wherein said satellite signal is a very small aperture (VAST) signal.

* * * * *